Dec. 2, 1941.    C. J. KUPPER    2,264,912
SCUM DRAWOFF
Filed Oct. 21, 1939    6 Sheets-Sheet 2

Inventor
Charles J. Kupper
By L. Donald Wagner
Attorney

Dec. 2, 1941.                C. J. KUPPER                2,264,912
                              SCUM DRAWOFF
                          Filed Oct. 21, 1939          6 Sheets-Sheet 5

Inventor
*Charles J. Kupper*

By L. Donald Wages
                                                        Attorney Dec. 2, 1941. C. J. KUPPER 2,264,912
SCUM DRAWOFF
Filed Oct. 21, 1939 6 Sheets-Sheet 6

Inventor
Charles J. Kupper
By L. Donald Myers
Attorney

Patented Dec. 2, 1941

2,264,912

UNITED STATES PATENT OFFICE 2,264,912

SCUM DRAWOFF

Charles J. Kupper, Bound Brook, N. J.

Application October 21, 1939, Serial No. 300,626

8 Claims. (Cl. 210—3)

This invention relates to new and useful improvements in methods and apparatus for removing scum, such as grease, oil, and other floating materials, from settling tanks, or the like, for sewage and industrial waste disposal plants.

Numerous methods and mechanisms have been proposed and employed for removing scum from settling tanks, or the like, of sewage or industrial waste disposal plants, but they have all been costly and have operated on principles which result in the delivery of the scum with either too high or tool low a percentage of moisture. The desired moisture content, of course, will vary with different methods of disposal, but in most cases the volume of water must be sufficient to enable the scum to flow through a pipe and be handled by a pump. An excess of water is undesirable and renders more difficult the subsequent treatment of the scum.

The primary object of this invention is to provide methods and apparatus for removing the scum from surfaces of bodies of liquid, confined in settling tanks, or the like, of various shapes in plan view, and concentrate the scum to a desired degree before passing the same onto subsequent disposal mechanisms, such as digestors, incinerators, or the like.

A further important object of the invention is to provide methods and apparatus of the above mentioned type which may be operated either continuously or intermittently and, if intermittently operated, may be controlled automatically in accordance with elapsed time or the accumulation of scum.

Other objects and advantages of the invention will be apparent during the course of the following description.

In the accompanying drawings forming a part of this specification and in which like numerals are employed to designate like parts throughout the same.

Figure 1:
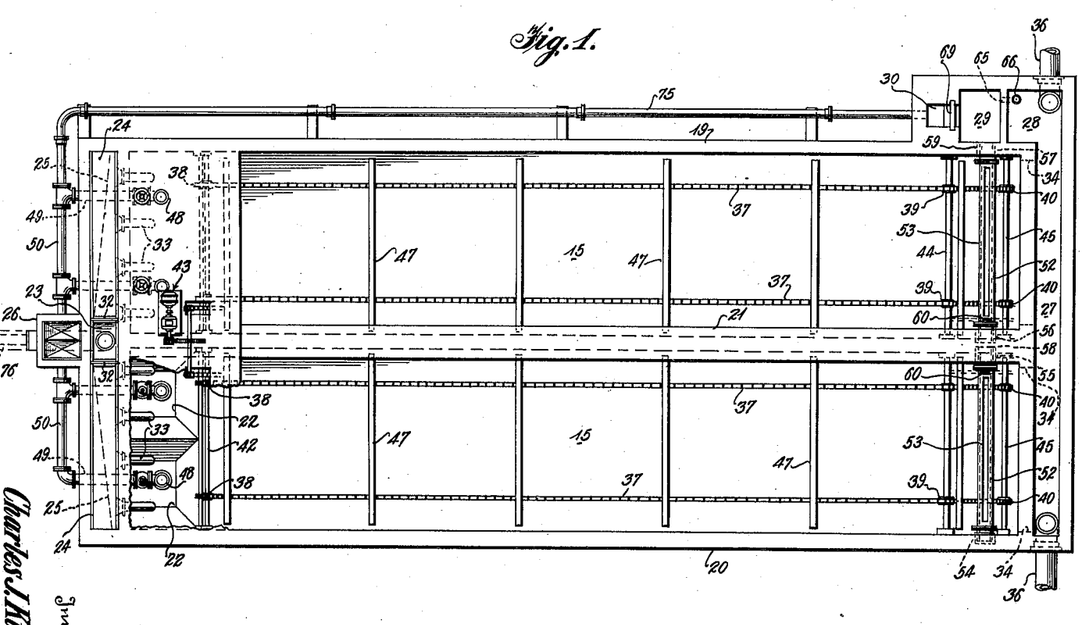
Figure 1 is a top plan view of one form of settling tank, or the like, with scum and sludge draw off mechanism operatively associated therewith.

In the drawings, wherein for the purpose of illustration are shown the preferred embodiments of this invention, and particularly referring to Figs. 1 to 4, inclusive, the reference character 15 designates each one of two settling tanks which are arranged in parallelism, as best illustrated in Fig. 1. Each one of these tanks is of rectangular shape in plan view, but it readily will be understood, as the description proceeds, that each tank could be of square formation in plan view, if desired.

Figure 2:
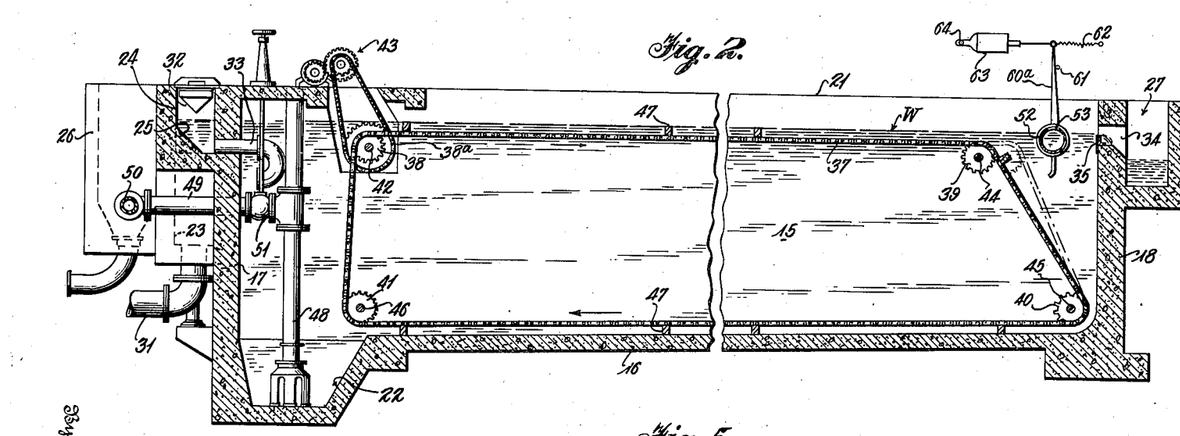
Figure 2 is a vertical sectional view taken longitudinally through one of the settling tanks of Fig. 1.
Figure 3:
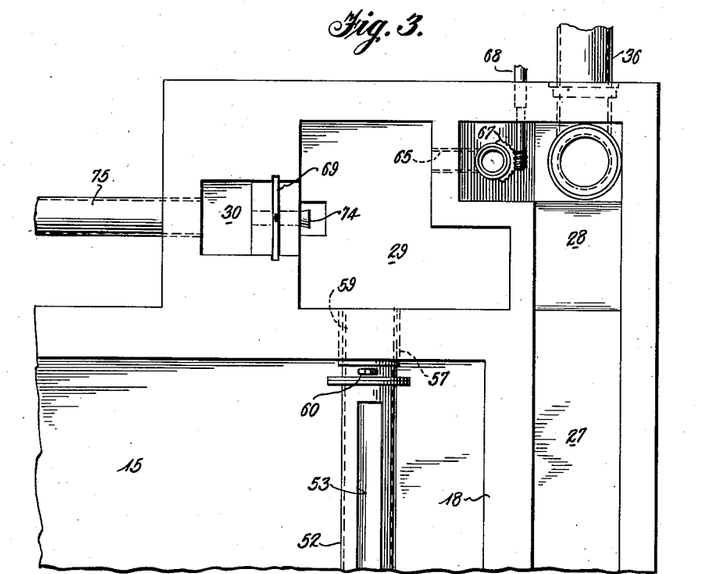
Figure 3 is a detail, plan view of a fragmentary portion of the mechanism disclosed in Figs. 1 and 2 and illustrates more clearly the manner in which the removed scum is concentrated prior to being passed on to subsequent disposal apparatus.
Figure 4:
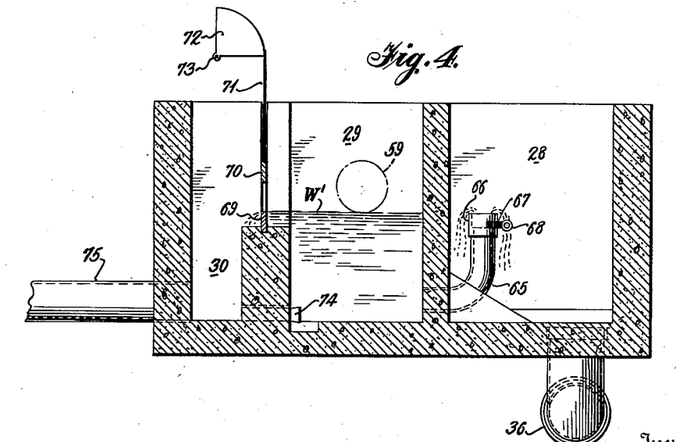
Figure 4 is a vertical, sectional view of the portion of the mechanism disclosed in detail in Fig. 3.

Figs. 1 and 2 clearly illustrate the settling tank as including a longitudinal bottom wall 16 which may be either sloping as shown or flat, end walls 17 and 18, outer side walls 19 and 20, and a common center wall 21. Adjacent the end wall 17, the bottom wall 16 of each settling tank is properly shaped to form a pair of sludge collection hoppers or sumps 22, see Figs. 1 and 2.

Exteriorly of this end wall 17, the two settling tanks 15 are provided with a common influent chamber 23. Extending in opposite directions from this influent chamber are the separate influent channels 24, one being provided for each settling tank 15. Figs. 1 and 2 clearly illustrate each influent channel 24 as having a laterally sloping and longitudinally tapering bottom wall 25. These sloping and tapering bottom walls 25 are so arranged that the bottom portion of each channel 24 is widest and deepest at its end adjacent the influent chamber 23.

Outwardly of the influent chamber 23 and the influent channels 24 is an inspection sludge sump 26 which may be arranged as shown or in any other suitable manner.

Figs. 1 and 2 clearly illustrate an effluent trough 27 as being arranged outwardly of the end wall 18 and as extending transversely of both settling tanks. Laterally of the outer side wall 19, the effluent trough 27 is enlarged, as at 28. Outwardly of the side wall 19 and longitudinally of the effluent trough enlargement 28, there is formed a separation or concentrating chamber 29. A concentrated scum receiving chamber 30 is arranged next to the chamber 29.

Raw sewage enters the influent chamber 23 by way of the influent pipe 31. From the influent chamber, the raw sewage flows over the V-notched weir plate 32, see Figs. 1 and 2, into the influent channels 24 for the two settling tanks 15. From each influent channel 24, the raw sewage, or industrial waste, is fed into its respective settling tank 15 through four pipes 33. These pipes are associated so as to discharge the influent against the inner surface of the end wall 17 of the setting tank.

The effluent is discharged from each settling tank 15 into the effluent trough 27 through a discharge opening 34. The desired tank liquid level W, see Fig. 2, is obtained by means of a weir plate 35. From the trough 27, the effluent is discharged through the pipe 36, see Fig. 1. For the purpose of moving the sludge, or settled solid, and the scum, or materials floating on or near the surface of the water, toward their respective points of collection and removal from the settling tanks, each tank is provided with an endless scraper conveyor. Each scraper conveyor includes the two chains 37 which are trained over sprockets 38, 39, 40, and 41. The sprocket 38 is the drive sprocket for its respective chain, and this drive sprocket is mounted on a shaft 42 which is common to both drive sprockets for a given conveyor. Suitable transmission mechanism for driving this shaft 42 and its two drive sprockets 38 is illustrated in Figs. 1 and 2 and is generally designated by the reference character 43. As many different types of drives may be employed, the one illustrated will not be described in detail. The sprockets 39 for the two chains of each conveyor are mounted on a shaft 44. This shaft is supported by suitable takeup bearings, not shown, which are used to maintain the conveyor chains at a desired degree of tautness. Adjustment of the chains for this purpose is indicated by dash lines in Fig. 2. The remaining sprockets 40 and 41 are mounted on shafts 45 and 46, respectively, which are supported in fixed bearings of any suitable construction.

The chains 37 of each conveyor are provided with a suitable number of wooden flights 47. The conveyors travel in the direction of the arrows in Fig. 2, and the flight chains for the horizontal runs of each conveyor are supported by the sprockets 38 to 41 and suitable tracks, not shown, located below the liquid level and on the tank floor so that the upper flights 47 move along the surface of the liquid to carry the scum toward the effluent end of the settling tank and the lower flights 47 move the sludge along the tank floor 16 toward and into the sludge hoppers 22 at the influent ends of the settling tanks.

The settled solids or sludge is withdrawn by a sludge pump, not shown, from the collection hoppers 22 through the pipes 48, 49, and 50 and is discharged into the inspection sludge sump 26. A valve 51 is provided in each pipe 49 for controlling the flow of sludge and liquid therethrough.

Positioned between the discharge or tail end of the upper run of each conveyor and the effluent discharge opening 34 is a scum draw off pipe or trough 52. These scum pipes or troughs 52 have an opening 53 for practically the whole width of their respective tanks. The troughs or pipes 52 are rotatably supported at their ends in bearings 54, 55, 56, and 57. The bearings 55 and 56 support the inner ends of the draw off pipes 52 in the common center wall 21 for the two settling tanks 15. This center wall 21 is provided with an opening 58 which registers with and establishes communication between the open, adjacent ends of the two pipes or troughs 52. The bearing 57 is received in an opening 59 which is formed in the tank wall between the adjacent settling tank 15 and the scum separating or concentrating chamber 29. The end of the pipe or trough 52 which is received in this bearing 57 is open and is in communication with this chamber 29. Therefore, any scum that flows into the troughs or pipes 52, with an appropriate volume of liquid, will flow through one or both of the pipes or troughs and will empty into the chamber 29.

Fig. 1 discloses each one of these pipes or troughs 52 as having an operating handle 60. By means of these operating handles, the troughs can be rotated so that their entrance openings 53 will be adjustably arranged with respect to the water level W of their respective tanks. Fig. 2 discloses the entrance opening 53 of one of the pipes or troughs 52 in a position above the liquid level. When in this position, no scum or liquid will flow into the pipe or trough 52. By suitably rotating the pipe or trough in a counterclockwise direction, as viewed in Fig. 2, the entrance opening 53 may be moved so that scum and an appropriate amount of liquid will flow through the opening into the pipe or trough.

Fig. 2 illustrates a handle or lever 60a of the trough 52 as being provided with power means for manipulating the same. In its closed position, the lever 60a engages a stop 61 and is maintained in this position by means of the spring 62. When it is desired to rotate the trough or pipe 52 so that its entrance slot 53 will receive scum from its settling tank, the solenoid 63 may be energized. This solenoid is supported for pivotal movement on the pivot pin 64 to take care of the arcuate travel of the free end of the lever 60a to which the solenoid armature is connected.

It is to be understood that this illustrated power mechanism is only one of many different types of devices which may be employed for manipulating the scum receiving trough pipe 52 and that any other suitable mechanism may be employed to suit the occasion. Of course, the spring and solenoid may be reversed so that the spring will normally hold the associated pipe or trough in a scum receiving position and the solenoid be used to move the pipe into a closed position.

The scum reaches the separation or concentration box or chamber 29 with an undesirable percentage of liquid for most disposal plants. It is proposed, therefore, to reduce the percentage of liquid in this box or chamber. To accomplish this desired result, a pipe 65 extends from the lower portion of the box or chamber 29 into the end enlargement 28 of the effluent trough 27. The upper end of this pipe 65 is provided with a threaded weir sleeve or collar 66 so that it may be raised and lowered. To accomplish rotary movement of this sleeve or collar, a rack 67 is carried by the same. This rack is engaged by a toothed shaft 68. This toothed connection between the sleeve or collar 66 and the shaft 68 may take different forms. For example, the shaft and rack may be of the worm type so that rotation of the shaft 68 will bring about rotation of the sleeve 66 or the shaft may take the form of a rack so that reciprocation of the same will bring about rotation of the sleeve or collar 66. Other suitable mechanism may be employed for adjusting the sleeve or collar 66 to bring about raising or lowering of the same due to its connection with the pipe 65. If desired, the sleeve may be slidably mounted on the pipe 65 and suitable mechanism provided for merely raising and lowering the same without rotating it.

The scum is withdrawn or skimmed from the top of the liquid within the separating box or chamber 29 by permitting it to flow with a predetermined percentage of liquid over the weir plate 69 and into the scum discharge box or chamber 30. To stop this skimming of scum from the top of the liquid in the box 29, a weir plate extension or a gate 70 may be lowered into engagement with the top edge of the weir plate 69. This weir plate extension or gate 70 may be raised and lowered by means of a cable 71 trained over an oscillating pulley sector 72 which is mounted on the shaft 73. This shaft may be actuated by any suitable mechanism. Of course, any other suitable mechanism may be employed for controlling the flow of scum from the separating or concentrating box or chamber 29 into the outlet chamber 30.

Of course, this scum removal and concentrating operation can be continuously carried on by arranging the scum withdrawing pipes or troughs 52 so that their openings 53 will continuously receive scum and liquid and by arranging the sleeve or collar 66 and by positioning the weir plate 69 so that liquid will be continuously discharged from the box or chamber 29 and scum will be continuously passed over the weir plate 69. It is generally desirable, however, to intermittently withdraw the scum from the settling tanks. Intermittent operation may either be manually controlled or automatically controlled. If it is automatically controlled, it may function in response to predetermined elapsed time intervals or in accordance with the accumulation of scum either at the draw off pipes or troughs 52 or in the separating or concentrating box or chamber 29. No attempt has been made to disclose automatic control mechanisms for the power operating means of the pipes or troughs 52, the sleeve or collar 66, and the weir plate extension or gate 70, as any one of many different well known forms of control devices can be used.

To obtain an accurate control of the percentage of liquid discharging from the separating or concentrating chamber 29 with the scum, the level of the top edge of the sleeve or collar 66 is set a desired distance below the liquid level of the tank effluent weir plate 35, and the top edge of the weir plate 69 is set at an elevation slightly higher than the liquid level or the top edge of the adjustable sleeve or collar 66.

When it is desired to completely drain the concentrating or separating box 29, the plug 74 may be withdrawn. The bottom portion of the box 29 then will drain into the chamber 30. The separated scum flows from the chamber 30 into the pipe 75 and may be carried by this pipe either directly to a digester, an incinerator, or the like, or the scum may be carried by this pipe to the inspection box 26 previously described as receiving the sludge from the collection hoppers or sumps 22 of the settling tanks 15. The sludge, and the scum if it is carried to the inspection box 26, is discharged through the pipe 76 to the next succeeding apparatus of the disposal plant.

Figure 5:
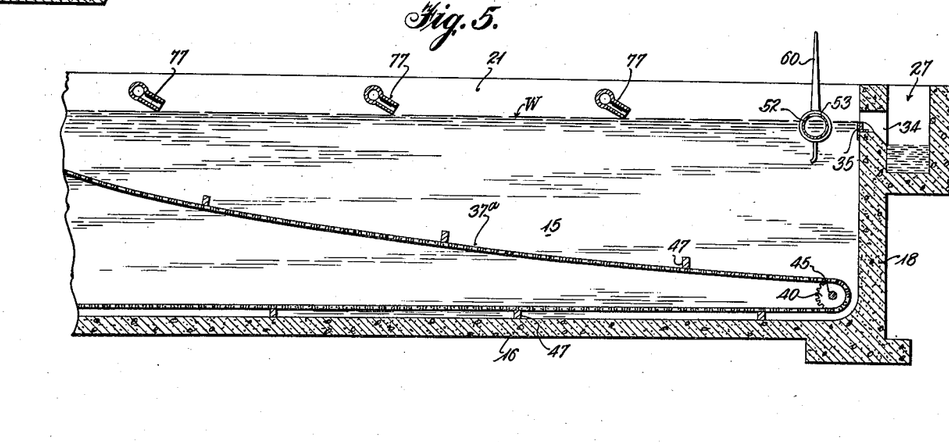
Figure 5 is a fragmentary, vertical, longitudinal sectional view of a settling tank, of the type illustrated in Fig. 2, but showing a modified form of mechanism for skimming the scum from the surface of a body of liquid within the settling tank.

It is to be understood that I do not desire to limit myself to any particular form of collecting mechanism for the sludge and the scum. For that reason, I have illustrated a modification in Fig. 5. In this figure, a scraper conveyor 37a is illustrated, and this conveyor differs from the conveyor of Figs. 1 and 2 by having its upper run located below the water line W and not used to collect the scum. This conveyor, therefore, only functions to collect the sludge and move it toward its point of discharge from the tank. The scum in this modification is moved toward the discharge trough or pipe 52 by air jets 77. Otherwise, the scum collecting mechanism of Fig. 5 is the same as that disclosed in Figs. 1 to 4, inclusive, and similar reference characters will be applied to similar elements.

In Figs. 6 to 11, inclusive, there are disclosed round settling tanks as distinguished from rectangular or square tanks. These round tanks 78 are formed with cylindrical side walls 79. A floor 80 is provided for each tank and slopes toward its center. Adjacent the center of the tank floor 80, a sludge collecting hopper or sump 81 is provided having a sludge draw off pipe 82 therefor. The influent for each tank is fed thereto through the influent pipe 83 and conduit 84 at the center of each settling tank.

Figure 6:
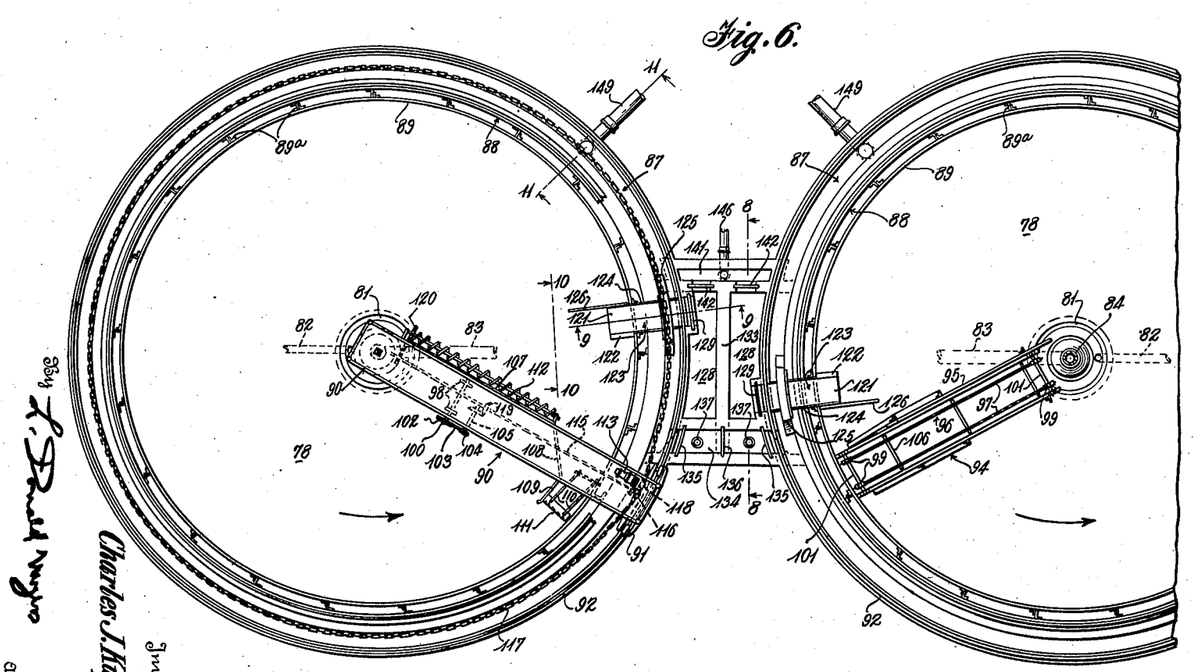
Figure 6 is a plan view of a different form of settling tank with scum and sludge draw off mechanism operatively associated therewith.
Figure 7:
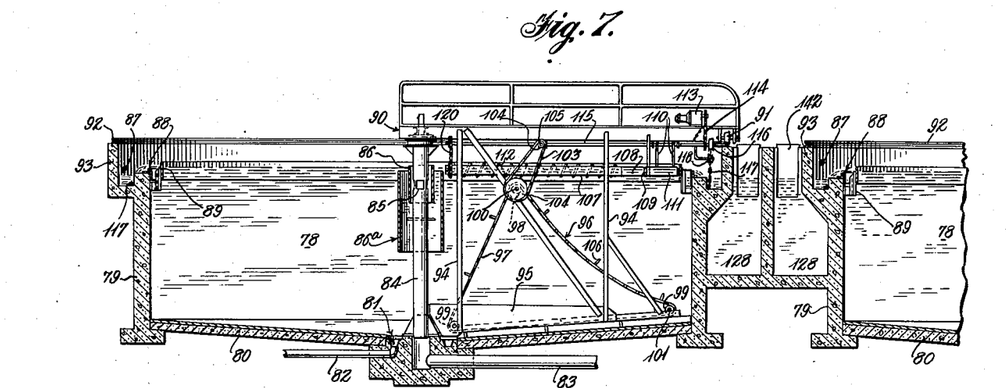
Figure 7 is a central, vertical, sectional view taken through the mechanism of Fig. 6.

The influent flows through the pipe 83 and into the conduit 84 and is discharged from the conduit through one or more suitable openings 85 into the cylindrical baffle 86. The influent flows under this baffle 86 and then over the upper edge of the cylindrical baffle 86a into the settling tank. This arrangement of baffles checks the fluid discharged through the openings 85 and affords an opportunity for considerable settling of material from the fluid immediately above the sludge collecting hopper or sump 81.

An effluent trough 87 surrounds the upper part of each settling tank. The effluent flows into the effluent trough 87 by passing over the top of the annular effluent weir 88. To prevent scum from following the effluent over the weir 88 into the effluent trough 87, an annular baffle 89 is provided and is supported from the upper edge portion of the side wall 79 by mounting brackets 89a.

Rotatable sludge and scum collectors for each tank are clearly illustrated in Figs. 6 and 7. Journaled on the upper end portion of the conduit 84 is the inner end of a bridge structure 90. The outer end of this bridge is supported by flanged wheels 91 running on the track 92 which is mounted on the offset part 93 of the side wall 79. Depending from the bridge is a carrying frame 94, see Fig. 7, which supports the sludge collecting mechanism. This mechanism includes a plow 95 which is constructed and arranged to sweep the entire floor 80 of the tank, as the bridge 90 rotates in the direction of the arrow in Fig. 6, and collects the sludge in advance thereof. The sludge accumulated in this manner is moved radially of the floor and into the sludge collecting hopper or sump 81 by the scraper conveyor 96.

This sludge conveyor includes the pair of chains 97 trained over sprockets 98 and 99 which are fixed to shafts 100 and 101, respectively. The shaft 100 is provided with a sprocket 102 over which is trained a drive chain 103 running over a drive sprocket 104 which is fixed to the shaft 105. The drive for this latter shaft will be described at a later point. Conveyor flights 106 are suitably attached to the chains 97 and, due to the direction of travel of the conveyor as indicated by the arrow in Fig. 7, these flights will move the sludge radially of the tank.

Figs. 6 and 7 disclose a scum plow 107 which is suitably attached to the carrying frame 94 of the bridge 90. The outer portion 108 of the scum plow is bent rearwardly and carries a part 109 which extends generally circumferentially of the tank, as is best illustrated in Fig. 6. Hinged to the bridge 90 by means of the arms 110 is a scraper 111. This scraper lies between the part 109 of the plow and the baffle 89. Any suitable means, not shown, may be employed for limiting the downward movement of the scraper. During rotary movement of the bridge 90, the scum floating on the surface of the liquid in the tank is collected by the plow 107. To effect outward movement of this scum relative to the main radially extending portion of the plow, a screw conveyor 112 is mounted in advance of the plow and is rotated in the proper direction to carry the scum to the bent portion 108 of the plow. The angle of this bent portion 108 and the rotation of the bridge 90 cause the collected scum to be delivered to the scraper 111.

The drive mechanism for the bridge and the various moving parts carried thereby now will be described. An electric motor 113 is mounted on the floor of the bridge 90. A chain, or other suitable drive, 114 connects the motor to the radial line shaft 115 which is arranged beneath the bridge floor. The outer end of this shaft 115 carries a sprocket wheel 116 over which is trained an endless tow chain 117 that normally lies in the effluent trough 87. This chain is guided in its travel up to the sprocket wheel 116 by means of a sheave 118. By this means when the sprocket wheel is rotated the bridge 90 pulls itself about the tank, using the chain as a traction means. It will be recognized that this type of bridge propelling mechanism is conventional and the substitution therefore of other conventional propelling mechanisms, such as driving a flanged wheel 91 which runs on the track 92, is contemplated when desired.

The shaft 105 of the sludge collecting conveyor is driven from the line shaft 115 by means of the bevel gears 119 while the shaft of the screw conveyor 112 is driven from the line shaft 115 by the chain and sprocket assembly 120. It will be appreciated that any desired differences in speeds between the various drive and driven shafts of the several mechanisms may be obtained by employing appropriate sized gear and sprocket wheels.

Figure 9:
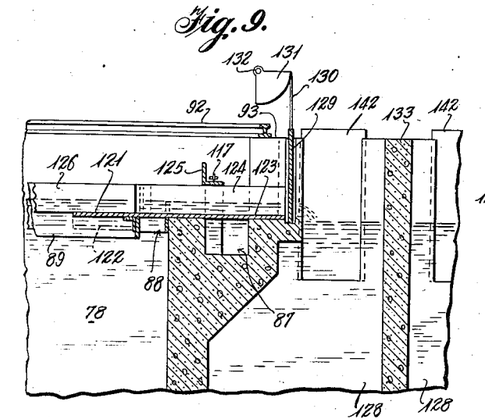
Figure 9 is a detail, vertical, sectional view taken on line 9—9 of Fig. 6.
Figure 10:
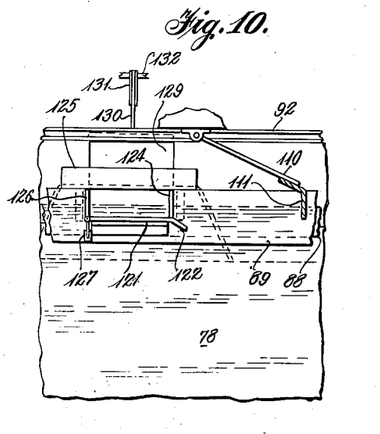
Figure 10 is a detail, vertical, sectional view taken on line 10—10 of Fig. 6.

As the scum is collected in a settling tank, it is carried around the tank and the scum, with a certain amount of water, passes out of the settling tank over the submerged scum shelf plate 121, see Figs. 6, 9, and 10. This self plate has a downwardly bent edge or flange 122 on its approach side to act as an inclined ramp for the material which is floating slightly below the surface of the water. This scum shelf plate is a continuation of the bottom wall 123 of a scum trough 124 which bridges the effluent trough in extending from the settling tank to scum separating or concentrating mechanism to be described. A guide 125 carries the tow chain 117 over the trough 124. To back up each scum shelf plate and to assist in guiding the scum thereon, a baffle plate 126 is associated with the rear of the shelf plate and projects radially inwardly of the settling tank relative to said shelf plate. This baffle plate 126 is clearly illustrated in Figs. 6, 9, and 10 as being hinged to the shelf plate 121 and as having a counterweight 127 for normally retaining it in its vertical position, see Fig. 10.

As the scum plow 107, with its scraper 111, see Figs. 6 and 10, approaches the scum shelf plate, the accumulated scum flows out of the settling tank over the shelf plate and the scum trough until the plow portion 108 engages the pivoted baffle plate 126. Further movement of the plow 108 causes the baffle plate to pivot about its hinge mounting and the plow passes beyond the plate. After the passage of the plow, the plate swings back to its normal position where it closes or obstructs the far side of the scum shelf plate 121.

Figure 8:
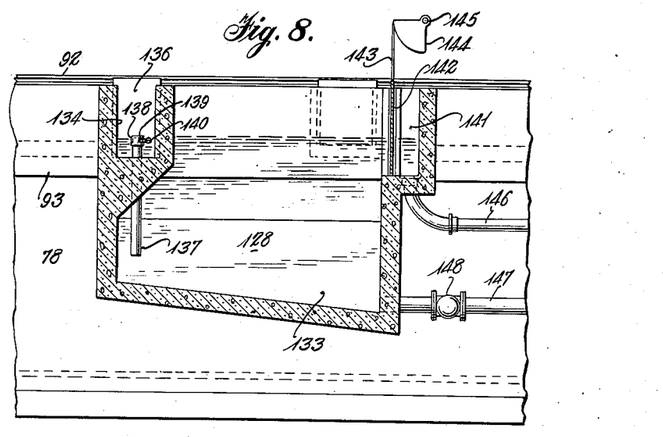
Figure 8 is a detail, vertical, sectional view taken on line 8—8 of Fig. 6.

Figs. 6 and 9 clearly disclose that the scum troughs 124 bridge the effluent troughs 87 and deliver the scum into the separate concentrating or separating boxes or chambers 128, see Figs. 6, 7, 8, and 9. Figs. 6, 9, and 10 disclose a slide gate 129 at the discharge end of each scum trough which controls communication between the trough and its respective concentrating box or chamber 128. These gates 129 can be raised and lowered by any suitable mechanism, but Figs. 9 and 10 disclose the same as being actuated by a cable 130 attached to a sector shaped pulley 131 which is mounted on an operating shaft 132. Any suitable mechanism may be employed for actuating the shaft 132. Figs. 6, 7, and 9 clearly illustrate the two concentrating boxes or chambers 128 as being separated or divided by the intermediate partition 133. Figs. 6 and 8 disclose a channel 134 which extends between the effluent trough 87 of the two settling tanks 78. This channel 134 is provided with gates 135 at its opposite ends for controlling communication between the channel and the respective effluent troughs 87. An additional gate 136 is provided intermediate the ends of the channel 134 and may be employed to divide the channel into two isolated sections.

Figs. 6 and 8 disclose a liquid draw off pipe 137 extending from each section of the channel 134 downwardly into the respective concentrating boxes or chambers 128. Fig. 8 discloses one of these pipes 137 as having threadedly mounted on its upper end an adjustable weir sleeve or collar 138. By threading this sleeve in opposite directions, its upper edge may be raised and lowered. This adjustment may be accomplished by means of rack teeth 139 carried by the sleeve and a rotating or reciprocating, toothed shaft 140. The pipe 137, adjustable sleeve 138, rack teeth 139 and toothed shaft 140 are, for all practical purposes, the same as the elements 65 to 68 inclusive of Figs. 3 and 4. Reference may be made to these last mentioned figures for a clearer understanding of the designated elements of Fig. 8. By means of these pipes 137, liquid may be withdrawn from the concentrating or separating boxes or chambers 128 and fed to the respective effluent channels or troughs 87 of the two settling tanks. By manipulation of the gates 135 and 136, the liquid withdrawn from the boxes or chambers 128 may be delivered to either one or both of the effluent troughs 87.

At the remaining ends of the concentrating boxes or chambers 128 there is provided a scum receiving tank or box 141. This tank or box is clearly illustrated in Figs. 6 and 8. Each chamber or box 128 is provided with a sliding gate 142 which controls communication between the boxes or chambers 128 and the scum receiving tank or box 141. Fig. 8 discloses one of these gates as being operated by a cable 143 which is trained over a sector shaped pulley, or the like, 144 carried by an operating shaft 145. This operating shaft may be actuated by any suitable mechanism.

Figure 11:
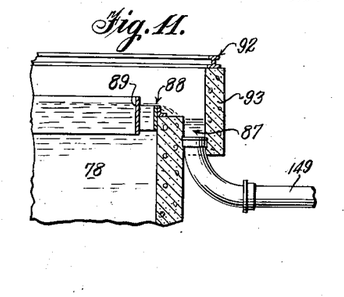
Figure 11 is a detail, vertical, sectional view taken on line 11—11 of Fig. 6.

Figs. 6 and 8 disclose a scum draw off pipe 146 which may be employed for carrying the scum from the tank or box 141 to a digester, or some other means of disposal. Fig. 8 also discloses a pipe 147 with a valve 148 which may be employed for draining the concentrating or separating boxes or chambers 128. Figs. 6 and 11 disclose effluent pipes 149 for carrying off the effluent from the troughs 87. The pipes 82 and 146 may be interconnected, if desired, to mix the scum and sludge.

By means of the adjustable sleeves 138, carried by the upper ends of the pipes 137, and the gates 142, the percentage of liquid flowing from the boxes or chambers 128 into the tank or box 141 with the scum may be very definitely controlled. The liquid level in the concentrating or separating boxes or chambers 128 is controlled and maintained by the adjustable sleeves or collars 138 on the pipes 137. During operation of the mechanism, the top edge of the adjustable sleeve or collar 138 for each box or chamber 128 should be set at an elevation lower than the fluid level in its respective settling tank 78. The top edge of each adjustable sleeve 138, also, should be slightly lower than the top of the effluent weir 88.

It will be appreciated that by adjusting the various gates 129, 135, 136, and 142 and the sleeves or collars 138 and leaving the same in their adjusted positions, the mechanism may be continuously operated. However, if it is desired to intermittently operate the scum draw off mechanism, this may be accomplished by intermittently raising and lowering the gates 129 or by intermittently raising and lowering the adjustable sleeves 138 carried by the pipes 137. The movement of these gates and sleeves may take place at predetermined time intervals or the adjustment of the same may be made in accordance with the amount of scum accumulated on the scum trough 123 or in the concentrating or separating boxes or chambers 128. Suitable automatic control mechanism may be employed for these elements. No attempt has been made to disclose the same as many suitable devices are readily available on the open market.

Figure 12:
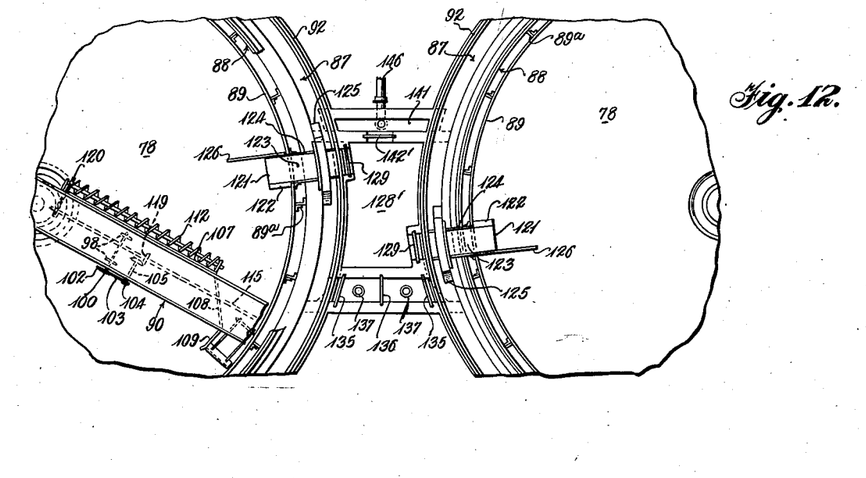
Figure 12 is a view similar to Fig. 6 but illustrates a modified form of concentrating or separating mechanism from that disclosed in Figs. 6 to 9, inclusive.

Fig. 12 illustrates a modification in connection with the concentrating or separating chambers or boxes disclosed in Figs. 6, 7, and 9. In Fig. 12, a single concentrating or separating box or chamber 128' is employed instead of the two boxes or chambers of the preceding figures. With this arrangement, it is believed to be desirable to employ two liquid discharge pipes 137, although one pipe may be used. By employing two pipes, and by providing the gates 135 and 136, the liquid discharged from the box or chamber 128' may be discharged into either or both of the effluent troughs 87 of the two settling tanks 78. A single scum discharge gate 142', however, is deemed to be sufficient. All of the remaining elements of the mechanism disclosed in Fig. 12 are the same as those disclosed in Figs. 6 to 11, inclusive, and for that reason the same reference numerals will be applied thereto.

It is believed that persons skilled in the art will be able to readily determine the mode of operation of each one of the scum draw off mechanisms disclosed and described above without being provided with any additional explanatory matter. It is believed to be important to note, however, that each one of the scum draw off mechanisms disclosed and described embodies the principle of providing very accurate control of the amount of liquid which is discharged with the scum from the concentrating, separating, or deliquiding boxes or chambers. This accurate control of moisture content of the scum is very desirable and clearly differs from the principle of operation where the scum is carried away from a settling tank, or the like, with the large volume of liquid which is discharged with the scum as a result of skimming the scum from the surface of the liquid in a settling tank.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. The method of collecting and conditioning scum and sludge from sewage and other liquid waste comprising introducing raw sewage or waste into a settling tank favoring settling of sludge and accumulation of scum at the surface of the liquid, collecting and removing the settled sludge, skimming the scum from the surface of the liquid and flowing it into a concentrating chamber with a percentage of liquid which is in excess of that desired for the finally conditioned scum, withdrawing the scum free effluent from the settling tank, maintaining a constant liquid level in the settling tank, removing the scum with the percentage of liquid desired for the finally conditioned scum from the top of the concentrating chamber, withdrawing the excess liquid from the bottom of the concentrating chamber and delivering it to the scum-free effluent, and maintaining a constant rate of withdrawal of the excess liquid by establishing the necessary relationship between the capacity of the flow path for the excess liquid and the elevation of delivery of the excess liquid relative to the liquid level in the concentrating chamber.

2. The method of removing scum and sludge from sewage and other liquid waste and conditioning the removed scum and sludge for subsequent treatment in additional disposal mechanism comprising introducing raw sewage or waste into a settling tank favoring accumulation of the scum at the surface of the liquid, collecting the sludge from the bottom of the settling tank and conveying it to a point of withdrawal from the tank, skimming the scum from the surface of the liquid in the tank and flowing it into a concentrating chamber with a percentage of liquid which is in excess of that desired for the final scum, withdrawing sludge and scum-free effluent from the settling tank, maintaining a constant liquid level in the concentrating chamber, removing the scum with the percentage of liquid desired for the final scum from the top of the concentrating chamber and mixing it with the withdrawn sludge, withdrawing the excess liquid from the bottom of the concentrating chamber and delivering it to the sludge and scum-free effluent, and maintaining a constant rate of withdrawal of the excess liquid by establishing the necessary relationship between the capacity of the flow path for the excess liquid and the elevation of delivery of the excess liquid relative to the liquid level in the concentrating chamber.

3. Apparatus for collecting and conditioning scum from sewage and other liquid waste comprising a settling tank, an influent for the tank, an effluent channel for the tank, means for skimming the scum from the surface of the liquid in the tank and moving it toward the effluent channel, a scum concentrating chamber, means for receiving the scum collected from the settling tank and feeding it with an excess volume of liquid into the concentrating chamber, means for maintaining a constant liquid level in the concentrating chamber, a scum outlet for the upper portion of the concentrating chamber through which the scum and a controlled quantity of liquid are discharged, and means for drawing off the excess liquid from the lower portion of the concentrating chamber and discharging it into the effluent channel at a controlled elevation with respect to the liquid level in the concentrating chamber for maintaining a constant rate of discharge of the excess liquid.

4. Apparatus for collecting and conditioning scum from sewage and other liquid waste comprising a settling tank, an influent for the tank, an effluent channel for the tank, means for skimming the scum from the surface of the liquid in the tank and moving it toward the effluent channel, a scum concentrating chamber, means for receiving the scum collected from the settling tank and feeding it with an excess volume of liquid into the concentrating chamber, means for maintaining a constant liquid level in the concentrating chamber, a scum outlet for the upper portion of the concentrating chamber through which the scum and a controlled quantity of liquid are discharged, a draw off pipe leading from the lower portion of the concentrating chamber to the effluent channel for discharging excess liquid from the chamber, and means operatively associated with the draw off pipe for varying the elevation at which it discharges the excess liquid relative to the liquid level in the concentrating chamber to maintain a constant rate of discharge of said liquid.

5. Apparatus for collecting and conditioning scum from sewage and other liquid waste comprising a settling tank, an influent for the tank, an effluent channel for the tank, means for skimming the scum from the surface of the liquid in the tank and moving it toward the effluent channel, a scum concentrating chamber, means for receiving the scum collected from the settling tank and feeding it with an excess volume of liquid into the concentrating chamber, means for maintaining a constant liquid level in the concentrating chamber, a scum outlet for the upper portion of the concentrating chamber through which the scum and a controlled quantity of liquid are discharged, a draw off pipe leading from the lower portion of the concentrating chamber to the effluent channel for discharging excess liquid from the chamber, and an adjustable sleeve carried by the end of the draw off pipe for regulating the rate of discharge of the excess liquid.

6. Apparatus for collecting and conditioning sludge and scum from sewage or other liquid waste comprising a settling tank, an influent connected to the tank, an effluent channel for the tank, means for collecting the sludge settled to the bottom of the tank and conveying it to a point of withdrawal from the tank, means for withdrawing the sludge from the tank, a scum concentrating chamber, means for skimming the scum from the surface of the liquid in the settling tank and feeding it with an excess volume of liquid into the concentrating chamber, means for maintaining a constant liquid level in the concentrating chamber including a scum outlet for the upper portion of the concentrating chamber through which the scum and a controlled quantity of liquid are discharged, a draw off pipe leading from the lower portion of the concentrating chamber to the effluent channel for discharging excess liquid from the chamber, and means operatively associated with the draw off pipe for varying the elevation at which it discharges the excess liquid relative to the liquid level in the concentrating chamber to maintain a constant rate of discharge of said liquid; and means for bringing together the sludge withdrawn from the settling tank and the scum withdrawn from the concentrating chamber.

7. Apparatus for collecting and conditioning scum and sludge from sewage or other liquid waste comprising a settling tank, an influent for the tank, an effluent channel for the tank, said influent and effluent channel being associated with spaced portions of the tank so that the sewage will flow directly from the former to the latter to provide the retention period for the sewage in the tank, means for collecting the sludge settling to the bottom of the tank and conveying it through the tank in the direction opposite to the direction of flow of the sewage to a point of withdrawal from the tank, a scum concentrating chamber, means for skimming the scum from the surface of the liquid in the settling tank and moving it in the direction of flow of the sewage toward the effluent channel, adjustable means for receiving the collected scum and feeding it with an excess volume of liquid at a desired rate into the concentrating chamber, a weir over which the sewage flows to the effluent channel after it is freed of scum, a scum outlet for the upper portion of the concentrating chamber including an adjustable weir over which the scum and a controlled quantity of liquid are discharged, a draw off pipe leading from the lower portion of the concentrating chamber to the effluent channel for discharging excess liquid from the chamber, an adjustable weir operatively associated with the effluent end of the said pipe, and means for adjusting the discharge level of the pipe weir relative to the liquid level in the concentrating chamber to maintain a constant rate of discharge of said liquid.

8. Apparatus for collecting and conditioning scum from sewage or other liquid waste comprising a settling tank, an influent for the tank, an effluent channel for the tank, said influent and effluent channel being associated with spaced portions of the tank so that the sewage will flow directly from the former to the latter to provide the retention period for the sewage in the tank, a scum concentrating chamber, means for skimming the scum from the surface of the liquid in the settling tank and moving it in the direction of flow of the sewage toward the effluent channel, adjustable means for receiving the collected scum and feeding it with an excess volume of liquid at a desired rate to the concentrating chamber, a weir over which the sewage flows to the effluent channel after it is freed of scum, a scum outlet for the upper portion of the concentrating chamber including an adjustable weir over which the scum and a controlled quantity of liquid are discharged, a draw off pipe leading from the lower portion of the concentrating chamber to the effluent channel for discharging excess liquid from the chamber, an adjustable weir operatively associated with the effluent end of the said pipe, and means for adjusting the discharge level of the pipe weir relative to the liquid level in the concentrating chamber to maintain a constant rate of discharge of said liquid.

CHARLES J. KUPPER.